United States Patent
Narayanan et al.

(10) Patent No.: US 7,792,111 B2
(45) Date of Patent: Sep. 7, 2010

(54) POINT-TO-MULTIPOINT FOR MULTICAST AND UNICAST FORWARDING

(75) Inventors: Ashok Narayanan, Lexington, MA (US); Robert Goguen, Acton, MA (US); Ali Sajassi, San Ramon, CA (US); Samir Vapiwala, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 12/148,816

(22) Filed: Apr. 23, 2008

(65) Prior Publication Data

US 2009/0268731 A1  Oct. 29, 2009

(51) Int. Cl.
*H04L 12/28* (2006.01)
*H04L 12/56* (2006.01)
(52) U.S. Cl. .................. 370/390; 370/352; 370/397; 709/238
(58) Field of Classification Search .................. None
See application file for complete search history.

(56) References Cited

U.S. PATENT DOCUMENTS

| | | | |
|---|---|---|---|
| 7,477,642 B2 * | 1/2009 | Aggarwal et al. | 370/390 |
| 2005/0169266 A1 * | 8/2005 | Aggarwal et al. | 370/389 |
| 2006/0159009 A1 * | 7/2006 | Kim et al. | 370/216 |
| 2007/0025277 A1 | 2/2007 | Sajassi et al. | |
| 2007/0127477 A1 * | 6/2007 | Peng et al. | 370/390 |
| 2007/0183419 A1 * | 8/2007 | Kompella | 370/389 |
| 2009/0003202 A1 * | 1/2009 | Polk et al. | 370/229 |
| 2009/0086644 A1 * | 4/2009 | Kompella et al. | 370/248 |
| 2009/0207845 A1 * | 8/2009 | Guan | 370/392 |

OTHER PUBLICATIONS

B. Davie et al., "Integrated Services in the Presence of Compressible Flows", IETF RFC 3006, Nov. 2000.
S. Yasukama, "Signaling Requirements for Point-to-Multipoint Traffic Engineered MPLS Label Switched paths", IETF RFC 4461, Apr. 2006.
R. Aggarwal et al., "Extensions to Resource Reservation Protocol-Traffic Engineering (RSVP-TE) for Point-to-Multipoint TE Label Switched Paths (LSPs)", IETF RFC 4875, May 2007.
L. Berger et al., "RSVP Refresh Overhead Reduction Extensions", IETF RFC 2961, Apr. 2001.

* cited by examiner

*Primary Examiner*—Hong Cho
*Assistant Examiner*—Robert C Scheibel
(74) *Attorney, Agent, or Firm*—Cindy Kaplan (57) ABSTRACT

A method and apparatus for establishing multicast and unicast forwarding are disclosed. In one embodiment, a method includes transmitting path messages to a plurality of receivers, receiving a plurality of messages in response to the path messages and establishing unicast and multicast forwarding based on received unicast and multicast labels. Each of the receivers is associated with a sub-LSP (Label Switched Path) in a Point-to-Multipoint (P2MP) LSP and the response messages include a multicast label and at least one unicast label corresponding to a unicast path to one of the receivers.

17 Claims, 6 Drawing Sheets

POINT-TO-MULTIPOINT FOR MULTICAST AND UNICAST FORWARDING

BACKGROUND OF THE INVENTION

The present disclosure relates generally to multicast and unicast forwarding in a computer network.

In multicast data transmission, data packets originating from a source node are delivered to a group of receiver nodes through a tree structure. Unicast communications take place between a single sender and a single receiver.

Certain applications such as Virtual Private Local Area Network (LAN) Services (VPLS) require a combination of unicast forwarding to one of many receivers and multicast forwarding to all of the receivers. This is implemented in conventional systems through the use of unicast labels exchanged by Label Distribution Protocol (LDP) and the replication of frames at the sender to broadcast messages. This is, however, expensive from a data perspective.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises transmitting path messages to a plurality of receivers, receiving a plurality of messages in response to the path messages and establishing unicast and multicast forwarding based on received unicast and multicast labels. Each of the receivers is associated with a sub-LSP (Label Switched Path) in a Point-to-Multipoint (P2MP) LSP and the response messages include a multicast label and at least one unicast label corresponding to a unicast path to one of the receivers.

In another embodiment, an apparatus generally comprises a processor configured to transmit path messages to a plurality of receivers, each of the receivers associated with a sub-LSP in a P2MP LSP, receive a plurality of messages in response to the path messages, each of the response messages comprising a multicast label and at least one unicast label corresponding to a unicast path to one of the receivers, and establish unicast and multicast forwarding based on the received unicast and multicast labels. The apparatus further includes memory for storing multicast and unicast forwarding entries.

In yet another embodiment, a method generally comprises receiving at a node in a P2MP LSP, a message from a downstream receiver, the message comprising a multicast label associated with a sub-LSP in said P2MP LSP, allocating a unicast label for the sub-LSP, installing a unicast forwarding entry, and transmitting the multicast label and the unicast label towards a source in the P2MP LSP.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A system and method described herein utilize Point-to-Multipoint (P2MP) to establish unicast and multicast forwarding. The system and method may be implemented, for example, in networks in which the unicast and multicast control planes are both LDP (Label Distribution Protocol), both MPLS/TE (MultiProtocol Label Switching/Traffic Engineering), or one LDP and one MPLS/TE. Conventional use of multicast technologies would require two separate control planes that provide LDP or MPLS/TE for unicast forwarding between peers, and P2MP for broadcast forwarding to a group. This has drawbacks including unnecessary frame replication, extra signaling, and maintenance overhead. Embodiments described herein use a P2MP Label Switched Path (LSP) to signal two sets of labels, one for multicast forwarding to an entire tree, and one for unicast forwarding to a receiver. The method and system described herein thus operate to establish a single unicast/multicast control plane for forwarding data to a group of receivers or transmitting data to individual receivers. Once the unicast paths and multicast tree are created, a source node can choose whether to broadcast to the tree (P2MP) or send a unicast message (Point-to-Point (P2P)) to an individual receiver. The source node can also specify individual bandwidth reservation parameters for each of the unicast LSPs, in case bandwidth reservation is required. The system and method described herein may be used with any application that requires both unicast and broadcast signaling. For example, the system may be used with Virtual Private Local Area Network (LAN) Services (VPLS) or broadcast and VoD (Video on Demand) unicast video within the same network.

Figure 1:
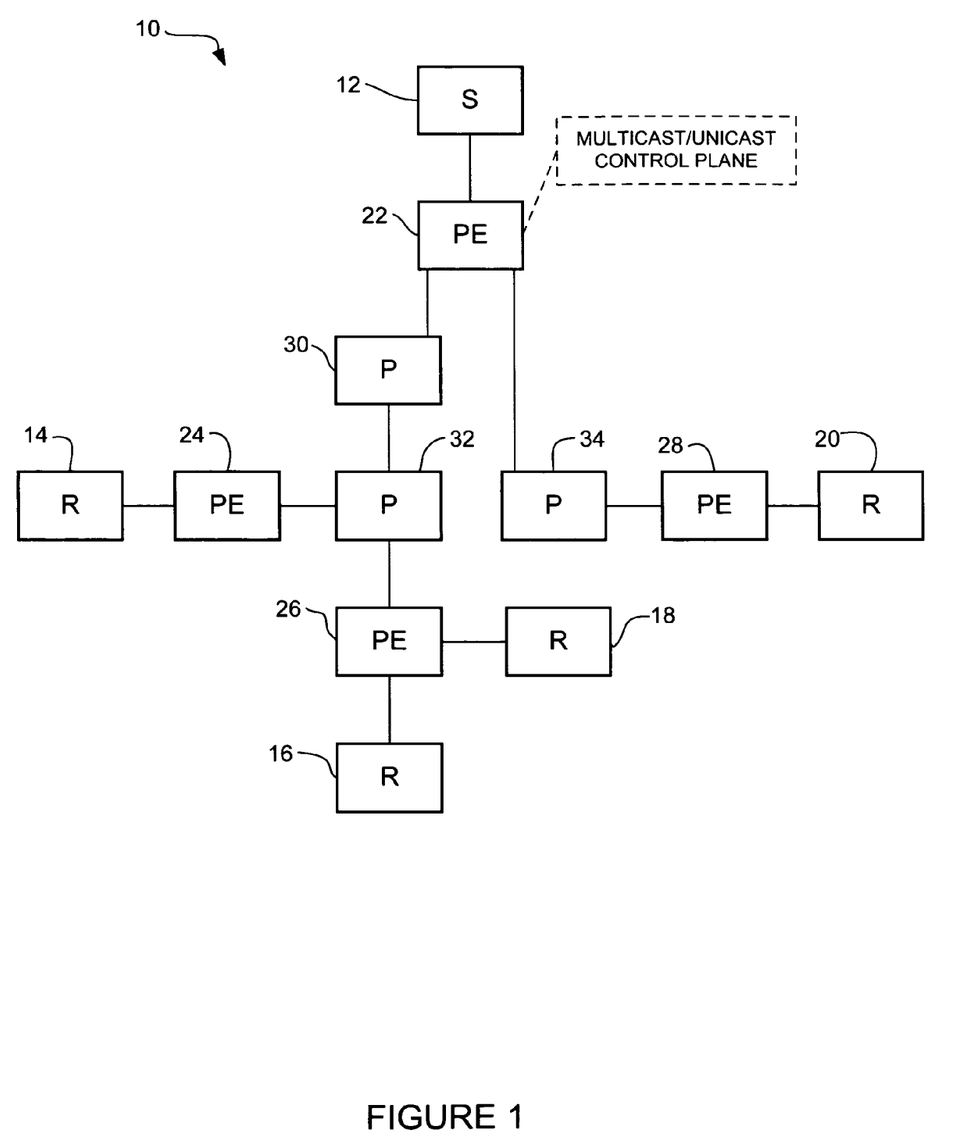
FIG. 1 illustrates an example of a computer network in which embodiments described herein may be implemented.

Referring now to the drawings, and first to FIG. 1, an example of a network 10 in which embodiments described herein may be implemented is shown. The embodiments described herein operate in the context of a data communication network including multiple network devices. The network device may include, for example, a master central processing unit (CPU), memory, interfaces, and a bus. In one embodiment, the network device is implemented on a general purpose network host machine as described below with respect to FIG. 6.

In the example shown in FIG. 1 a service provider network comprises a plurality of provider edge (PE) nodes 22, 24, 26, 28 and intermediate provider (P) nodes 30, 32, 34. PE node 22 is connected to a source (S). PE node 24 is connected to a receiver (R) 14, PE node 28 is connected to a receiver 20, and PE node 26 is connected to receivers 16 and 18.

The source is a multicast traffic source and the receiver (destination) is a multicast group member. It is to be understood that a provider edge node (PE 22) having a host in its subnet that is a multicast traffic source may also be referred to as a source node. Similarly, a provider edge node (PE 24, PE 26, PE 28) having a multicast group member in its subnet may be referred to as a receiver node. The provider edge and provider nodes may be routers, switches, bridges, gateways, or other network devices. It is to be understood that the network 10 shown in FIG. 1 is only one example and that the embodiments described herein may be implemented in other types of networks having different configurations or components.

In the network of FIG. 1, PE 22 is an ingress LSR (Label Switched Router) and PE 24, PE 26, and PE 28 are egress LSRs. Branch node P 32 is an LSR that can replicate incoming data on to one or more outgoing interfaces. Upon PE 22 learning that PE nodes 24, 26, or 28 are interested in joining a P2MP tree, PE 22 computes paths to reach each of the egress PE nodes and establishes a P2MP LSP. The P2MP LSP is used to signal both multicast (tree) labels and unicast labels.

In one embodiment, Resource Reservation Protocol-Traffic Engineering (RSVP-TE) is used for the set up of Traffic Engineered point-to-multipoint label switched paths in a MultiProtocol Label Switching (MPLS) network. (See, for example, RFC 4875 ("Extensions to Resource Reservation Protocol-Traffic Engineering (RSVP-TE) for Point-to-Multipoint TE Label Switched Paths (LSPs)", R. Aggarwal et al., May 2007.) The P2MP LSPs may also be established utilizing MLDP (Multicast Label Distribution Protocol), for example.

RSVP reserves resources for a flow, which is defined in MPLS as a LSP. Two primary messages are used for the setup of RSVP sessions; a Path message and a Resv (reservation request) message. The Path message is sent from the sender host along the data path and stores the path state in each node along the path. The path state includes the IP address of the previous node and a SENDER_TSPEC object which describes the bandwidth and traffic characteristics of the LSP. Each intermediate RSVP-capable router intercepts the Path message and installs or updates a path state entry for the sender. When a Path message arrives at the intended receiver, the receiving host (if interested in receiving the data) responds by sending a Resv message that reserves the resources along the same network path traveled by the Path message and carries the MPLS labels for the LSP. Resv messages create and maintain a reservation state in each router along the way. Both RSVP and non-RSVP routers forward Path messages towards the destination address using their local unicast or multicast routing table. The Resv message includes a FLOWSPEC data object that identifies the resources the flow needs and a FILTERSPEC data object, which defines the set of packets that are affected by the FLOWSPEC. The Resv message also includes a LABEL object with the MPLS labels used to set up the LSP.

In the example of FIG. 1, egress LSRs 24, 26, and 28 generate a Resv message. A node upstream of the egress node allocates its own labels (described below) and passes them upstream in the Resv message. The node may combine multiple flow descriptors from different Resv messages received from downstream, in one Resv message sent upstream. The node that sends the Resv message for a P2MP LSP upstream associates the labels assigned by this node with all the labels received from downstream Resv messages for that P2MP LSP. A branch LSR may or may not combine Resv state from multiple receivers into a single Resv message to be sent upstream. For example, branch node P 32 in FIG. 1 may split Path messages going downstream, and may aggregate Resv messages upstream. The aggregate Resv messages carry a label upstream for each FILTERSPEC signaled.

Figure 2:
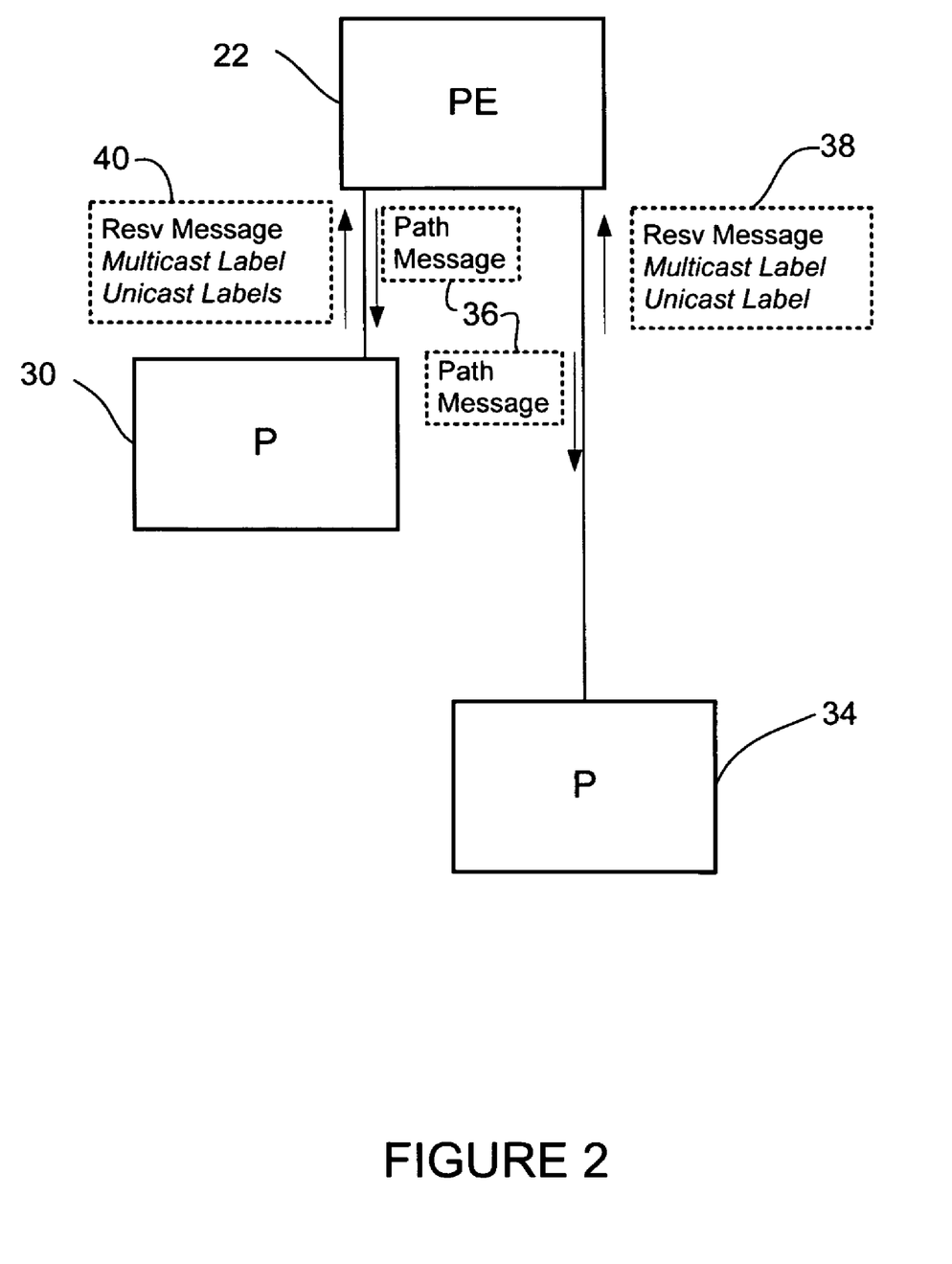
FIG. 2 illustrates message transmissions within the network of FIG. 1 for establishing unicast and multicast forwarding in the network.

FIG. 2 illustrates the flow of Path and Resv messages transmitted between PE 22 and P nodes 30, 34. For simplification only three of the nodes of network 10 of FIG. 1 are shown. Path messages 36 are transmitted from PE node 22 and traverse the network on a hop-by-hop basis through the P nodes of the network. In response to the Path messages, Resv messages 38, 40 are returned to PE node 22. As previously described, Resv messages follow the reverse path of Path messages. The Resv messages 38, 40 contain a multicast (tree) label for use in setting up multicast forwarding at PE 22 and one or more unicast labels for establishing unicast forwarding. The P2MP LSP is therefore used to signal both multicast and unicast labels for setting up multicast and unicast forwarding along with the P2MP paths, A P2MP LSP is comprised of multiple source-to-leaf (S2L) sub-LSPs, one to each receiver. The Path message may signal one or multiple S2L sub-LSPs for a single P2MP LSP. A sub-LSP is a segment of the P2MP TE LSP that runs from one of the LSP's LSRs to one or more of its other LSRs. S2L sub-LSP thus refers to the path from the source to one specific leaf. These S2L sub-LSPs are set up between ingress and egress LSRs and are combined by branch LSRs to result in a P2MP TE LSP. A series of S2L sub-LSP objects identify the individual receivers that are part of the tree. In the network of FIG. 1, the ingress LSR (PE 22) initiates the setup of an S2L sub-LSP to each egress LSR (PE 24, PE 26, PE 28) that is a destination of the P2MP LSP.

Figure 3A:
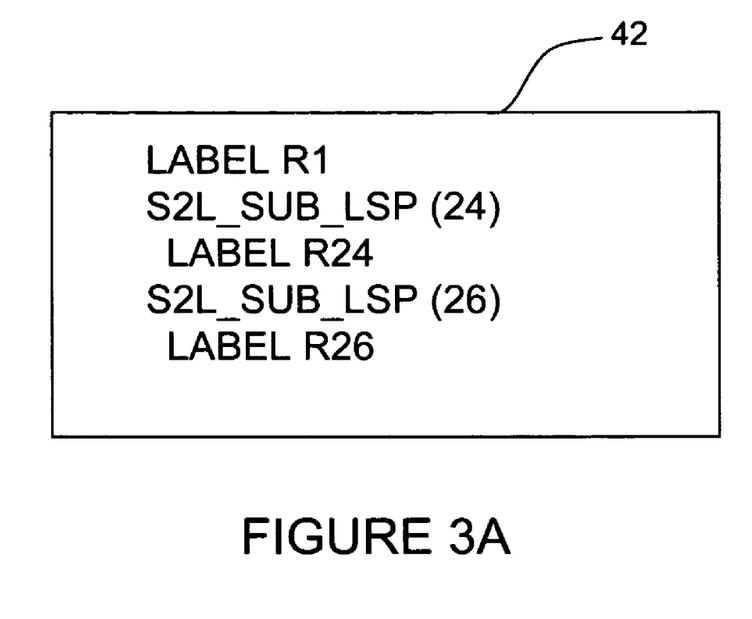
FIG. 3A is an example of a point-to-multipoint object list including unicast labels.

FIGS. 3A and 3B illustrate examples incorporating individual unicast labels in an S2L sub-LSP object list transmitted in the Resv message. In one embodiment, the S2L sub-LSP objects are interleaved with unicast label objects. For example, FIG. 3A illustrates a list 42 of unicast and multicast labels transmitted in a Resv message from P 32 to P 30 (FIG. 1). The unicast label objects correspond to the S2L sub-LSP immediately preceding it. A multicast tree label RI corresponds to the label used by the ingress PE to reach all members in the tree. S2L_SUB_LSP (24) corresponding to the sub-LSP between ingress LSR 22 and egress LSR 24 (FIG. 1) has an associated unicast label (LABEL R24) corresponding to the P2P path from ingress LSR 22 to receiver 14. S2L_SUB_LSP (26) corresponding to the sub-LSP between ingress LSR 22 and egress LSR 26 has an associated unicast label (LABEL R26). This model works whether individual S2L sub-LSPs are signaled using separate Path/Resv messages, or aggregated into one or more Path/Resv messages.

Figure 3B:
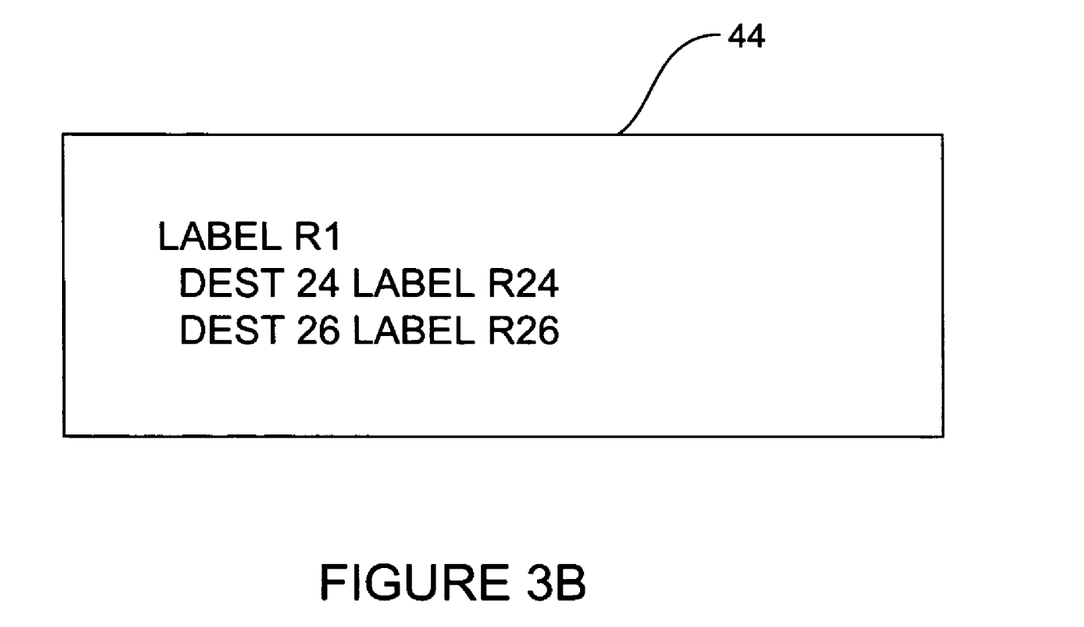
FIG. 3B is another example of a point-to-multipoint object list including unicast labels.

In another embodiment, a multicast label object includes the sub-LSP destination address and the label to reach it. For example, FIG. 3B illustrates a multicast label object 44 containing a single multicast label and two unicast labels, each corresponding to a specified destination address for use in establishing the P2P paths. The first destination (24) incorporates a unicast label R24. The next destination (26) includes a unicast label R26.

It is to be understood that the formats shown in FIGS. 3A and 3B and described above for transmitting both multicast and unicast labels are only examples and that other formats may be used.

It is possible that only some of the nodes in the network are configured to use the enhanced P2MP TE forwarding model described herein. A node that is not configured to recognize the unicast labels will preferably drop the unicast labels and transmits the message with the conventional multicast label objects (S2L sub-LSP list). Also, not all leaf nodes may choose to include unicast labels in their Resv message. Therefore, unicast forwarding may only be provided to a subset of leaf nodes. In this case, the head-end node (PE 22) will be aware of which nodes do not have unicast paths defined. In an alternative embodiment, extensions may be used to discover nodes in the network that do not support this enhanced forwarding model. For example, BGP (Border Gateway Protocol), IGP (Interior Gateway Protocol), or LDP may be used to identify these nodes.

Figure 4:
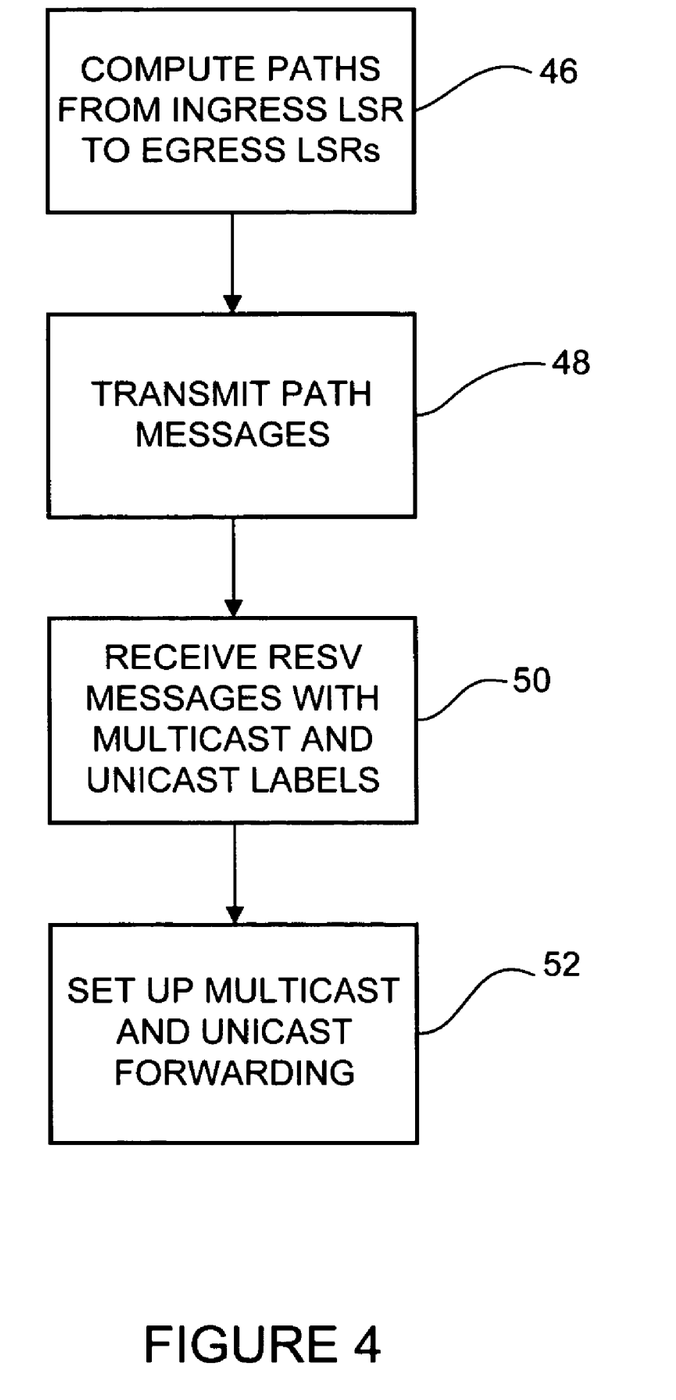
FIG. 4 is a flowchart illustrating a process for establishing unicast and multicast forwarding using point-to-multipoint label switched paths at a source node.

FIG. 4 is a flowchart illustrating a process for establishing unicast and multicast paths using P2MP LSPs at a source node, in accordance with one embodiment. Upon learning that one or more egress LSRs are interested in joining a P2MP tree, the ingress LSR computes the paths to the egress LSRs (step 46). Referring to the network shown in FIG. 1, PE 22 computes the path to reach PE 28 and establishes the S2L sub-LSP to PE 28 through P 34. PE 22 also computes the path to reach PE 24 when it discovers PE 24, and establishes the S2L sub-LSP through nodes P 30 and P 32. The path to PE 26 is computed to share the same links where possible with the sub-LSP to PE 24 as they belong to the same P2MP session.

The ingress LSR 22 then transmits one or more Path messages at step 48. In response to receiving the Path message, a response (e.g., Resv) message is generated at each of the egress LSRs and transmitted upstream towards the source. The Resv messages include a multicast (tree) label and one or more unicast labels. For example, P 32 receives a Resv message from PE 26 with a multicast label corresponding to the tree and a unicast label corresponding to the sub-LSP for PE 26. P 32 also receives a Resv message from PE 24 with a multicast label for the tree and a unicast label for the sub-LSP for PE 24. Node P 32 reserves bandwidth for the LSP, then allocates a local multicast tree label and unicast LSP labels for each of the downstream PEs (24 and 26). Node P 32 then installs local MPLS forwarding label bindings for each of these label pairs (multicast, unicast to P 24, unicast to P 26), and sends a Resv message to node P 30, containing the locally allocated multicast label and both the locally allocated unicast labels. Node P 30 performs the same operation (reserves bandwidth for the LSP, allocates three local labels, installs MPLS forwarding label), and sends the Resv message containing the locally allocated multicast and unicast labels to PE 22. At step 50, the ingress LSR 22 receives the Resv messages with the multicast labels for the P2MP tree, plus a unicast label for each of the receivers. Upon receiving the Resv messages, ingress LSR 22 programs multicast forwarding for the tree and unicast forwarding for each of the receivers (step 52). The unicast and multicast forwarding entries may be stored in a forwarding information base, for example. The ingress LSR 22 can then choose whether a frame is to be broadcast to the tree or unicast to a single receiver, by selecting the corresponding label/interface to use.

Figure 5:
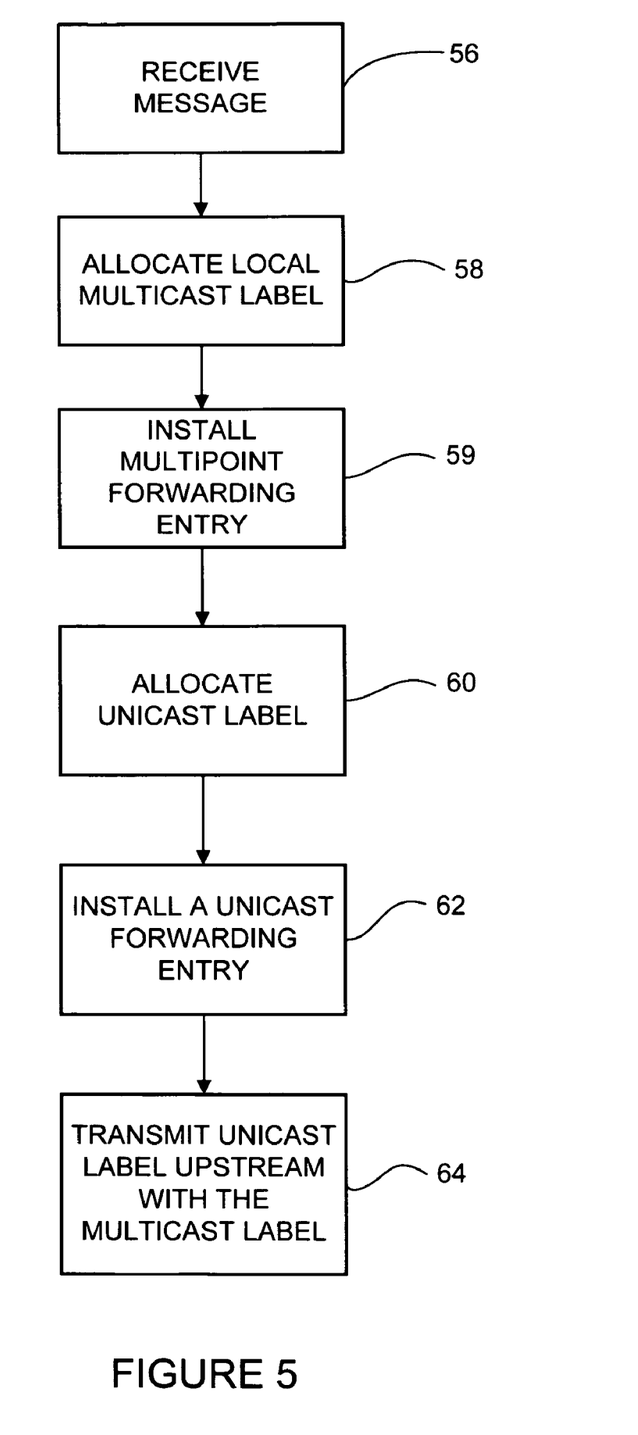
FIG. 5 is a flowchart illustrating allocation of multicast labels and unicast labels at a receiver or intermediate node in the network of FIG. 1.

FIG. 5 is a flowchart illustrating allocation of multicast labels and unicast labels at an intermediate node. At step 56, the node receives a Resv message. The node allocates a local multicast (tree) label and installs multipoint forwarding for the tree using the local multicast label and the incoming tree labels for individual Resv messages (steps 58 and 59). The node is configured to process the individual LABEL objects within the S2L-SUB_LSP list. The node allocates a new unicast label for each S2L_SUB_LSP received with a label (step 60). The node also installs a unicast forwarding entry for the label received with the S2L_SUB_LSP (step 62) and sends the allocated label upstream (step 64).

It is to be understood that the processes described above are only one examples and that steps may be added or removed without departing from the scope of the invention. Furthermore, the above examples describe setting up P2MP LSPs using RSVP, however, as noted above, other protocols may be used. Therefore, the terms "Path" and "Resv" messages as used herein include other types of signaling messages that may be used to set up P2MP LSPs.

Fast Reroute (FRR) programming may be done by each PLR (Point of Local Repair) as if separate unicast and multicast LSPs were signaled. For zero-bandwidth LSPs used for FRR, no further changes are required to the conventional model. If bandwidth allocation and traffic engineering is required in the network, changes may be required. In a tree bandwidth allocation model, bandwidth is allocated for the tree only and not for any of the unicast LSPs. In a per-LSP bandwidth allocation model, bandwidth is allocated for the tree and for each of the individual LSPs. If a model is not specified, the default model is preferably the tree model.

In one embodiment, the head-end (ingress LSR 22) selects the use of per-LSP bandwidth allocation by including an additional SENDER_TSPEC along with each of the S2L_SUB_LSP and unicast label objects. This specifies the amount of bandwidth to be reserved for the unicast LSP to the specific destination. Each node allocates bandwidth for the multicast tree and each of the unicast LSPs. Each receiver includes a FLOWSPEC for the tree (reflecting the bandwidth for the tree signaled in the global SENDER_TSPEC), as well as a FLOWSPEC for the unicast destination reflecting the bandwidth it received in the SENDER_TSPEC for this unicast destination. The head-end may optionally not include SENDER_TSPEC with any subset of S2L_SUB_LSPs to indicate that per_LSP bandwidth need not be allocated for these unicast LSPs. If a node cannot satisfy the bandwidth allocation requirements of any of the LSPs (tree or unicast), the node preferably generates a ResvErr (reservation error) to the receiver carrying the specific TSPEC. This can be signaled back to the head-end via a Path Error, and a new tree recomputed if bandwidth is available, or with new bandwidth constraints.

Although individual LSPs may have different bandwidth requirements from the tree, the individual unicast LSPs should not diverge from the tree. It is preferably the responsibility of the head-end to select a tree which satisfies the bandwidth requirements of the tree as well as any unicast LSPs which require additional bandwidth.

Figure 6:
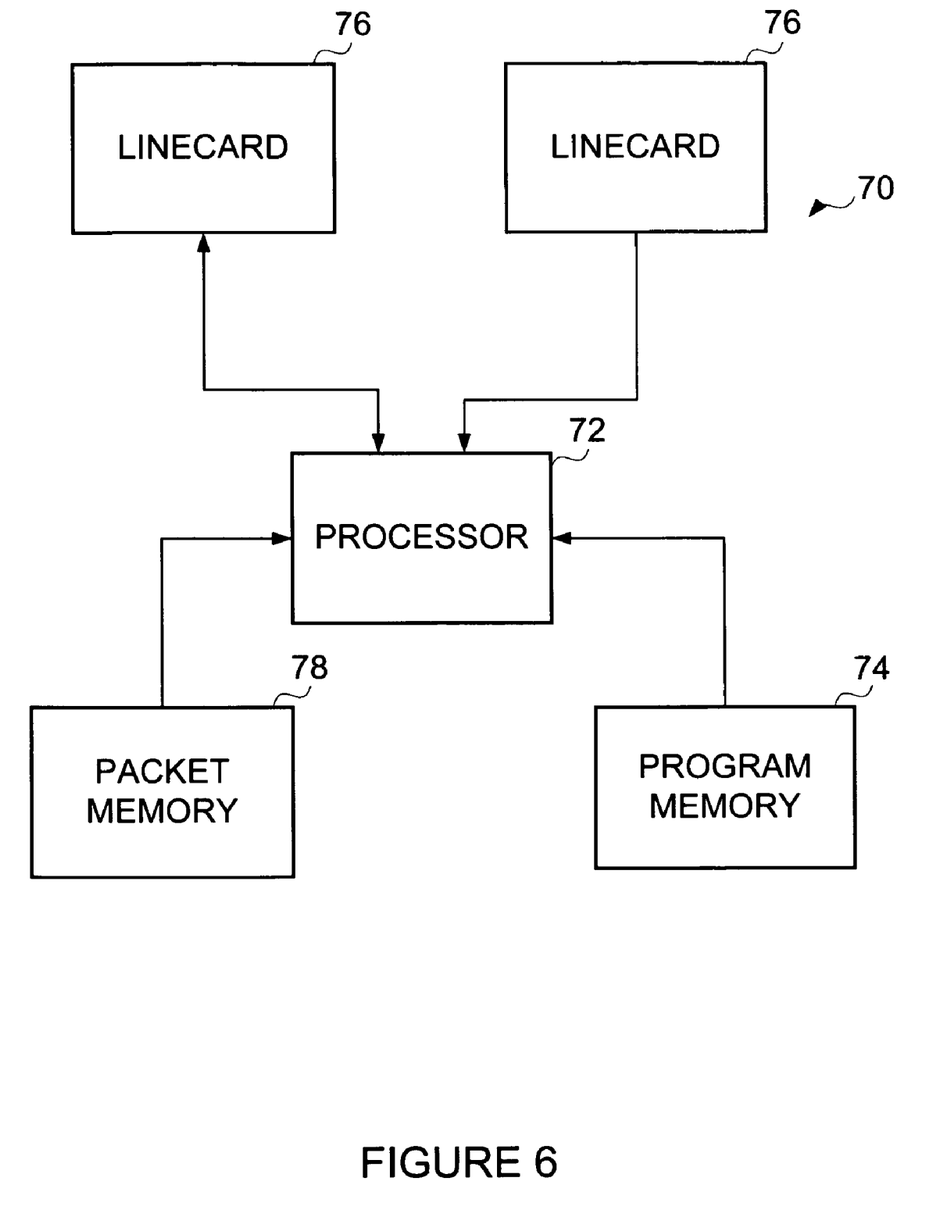
FIG. 6 depicts an example of a network device useful in implementing embodiments described herein.

FIG. 6 depicts a network device 70 that may be used to implement embodiments described herein. Network device 70 is configured to implement all of the network protocols and extensions thereof described above. In one embodiment, network device 70 is a programmable machine that may be implemented in hardware, software, or any combination thereof. A processor 72 executes codes stored in a program memory 74. For example, embodiments disclosed herein may be encoded as logic in one or more tangible media for execution and, when executed, operable to perform the encoded embodiments. Program memory 74 is one example of a computer-readable medium. Program memory 74 can be a volatile memory. Another form of computer-readable medium storing the same codes is a type of non-volatile storage such as floppy disks, CD-ROMs, DVD-ROMs, hard disks, flash memory, etc.

Network device 70 interfaces with physical media via a plurality of linecards 76. Linecards 76 may incorporate Ethernet interfaces, DSL interfaces, Gigabit Ethernet interfaces, 10-Gigabit Ethernet interfaces, SONET interfaces, etc. As packets are received, processed, and forwarded by network device 70, they may be stored in a packet memory 78. To implement functionality according to the system, linecards 76 may incorporate processing and memory resources similar to those discussed above in connection with the network device as a whole. It is to be understood that the network device 70 shown in FIG. 6 and described above is only one example and that different configurations of network devices may be used.

As can be observed from the foregoing, the system and method described herein provide numerous advantages. For example, the system and method are efficient in the data plane by minimizing unnecessary frame replication. They are also efficient in the control plane because they remove the requirement to have separate unicast and multicast control planes. The use of MPLS/TE and P2MP/TE allows for the use of FRR for high-speed failure enhancement, which is supported by the implementations described herein.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   transmitting path messages to a plurality of receivers, each of said plurality of receivers associated with a sub-LSP (Label Switched Path) in a Point-to-Multipoint (P2MP) LSP;
   receiving a plurality of messages in response to said path messages, each of said response messages comprising a multicast label and at least one unicast label corresponding to a unicast path to one of said receivers; and
   establishing at a network device, unicast and multicast forwarding based on said received unicast and multicast labels;
   wherein said plurality of response messages each comprises one or more unicast label objects interleaved with one or more sub-LSP label objects.

2. The method of claim 1 further comprising allocating bandwidth for a multicast tree corresponding to said P2MP LSP for said multicast forwarding and for unicast LSPs for said unicast forwarding.

3. The method of claim 1 wherein said plurality of response messages each comprises one or more sub-LSP label objects comprising a sub-LSP destination address and a corresponding label.

4. The method of claim 1 wherein said response messages comprise Resv messages.

5. The method of claim 1 wherein said path message specifies a bandwidth to be reserved for a unicast LSP.

6. The method of claim 1 wherein said response message comprises a multicast bandwidth reservation and a unicast bandwidth reservation.

7. An apparatus comprising:
   a processor configured to transmit path messages to a plurality of receivers, each of said plurality of receivers associated with a sub-LSP (Label Switched Path) in a Point-to-Multipoint (P2MP) LSP, receive a plurality of messages in response to said path messages, each of said response messages comprising a multicast label and at least one unicast label corresponding to a unicast path to one of said receivers, and establish unicast and multicast forwarding based on said received unicast and multicast labels; and
   memory for storing multicast and unicast forwarding entries;
   wherein said plurality of response messages each comprises one or more unicast label objects interleaved with one or more sub-LSP label objects.

8. The apparatus of claim 7 wherein the processor is further configured to allocate bandwidth for a multicast tree corresponding to said P2MP LSP for said multicast forwarding and for unicast LSPs for said unicast forwarding.

9. The apparatus of claim 7 wherein said plurality of response messages each comprises one or more sub-LSP label objects comprising a sub-LSP destination address and a corresponding label.

10. The apparatus of claim 7 wherein said response messages comprise Resv messages.

11. The apparatus of claim 7 wherein said path message specifies a bandwidth to be reserved for a unicast LSP.

12. The apparatus of claim 7 wherein said response message comprises a multicast bandwidth reservation and a unicast bandwidth reservation.

13. A method comprising:
    receiving at a node in a Point-to-Multipoint (P2MP) Label Switched Path (LSP), a message from a downstream receiver, said message comprising a multicast label associated with a sub-LSP in said P2MP LSP;
    allocating a unicast label for said sub-LSP;
    installing a unicast forwarding entry; and
    transmitting said multicast label and said unicast label towards a source in said P2MP LSP, wherein transmitting said multicast and unicast labels comprises transmitting one or more unicast label objects interleaved with one or more sub-LSP label objects.

14. The method of claim 13 wherein transmitting said multicast and unicast labels comprises transmitting one or more sub-LSP label objects comprising a sub-LSP destination address and a corresponding label.

15. The method of claim 13 wherein transmitting said multicast and unicast labels further comprises transmitting a multicast bandwidth reservation and a unicast bandwidth reservation.

16. The method of claim 13 further comprising generating an error message if the node cannot meet multicast or unicast bandwidth allocation requirements.

17. The method of claim 13 wherein transmitting said multicast and unicast labels comprises transmitting a Resv message.

* * * * *